Oct. 19, 1948.          H. C. HOLMES          2,451,620
                     LUMBER ROLL ASSEMBLY
                     Filed Sept. 23, 1946
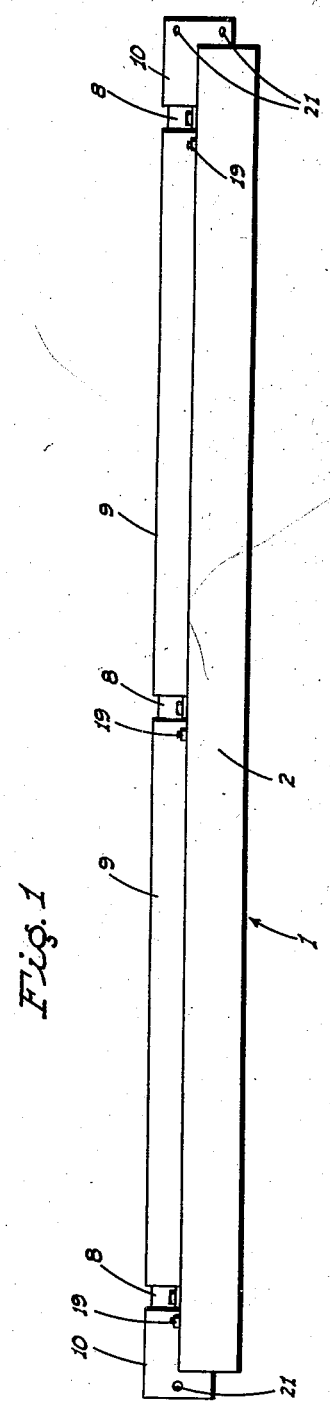
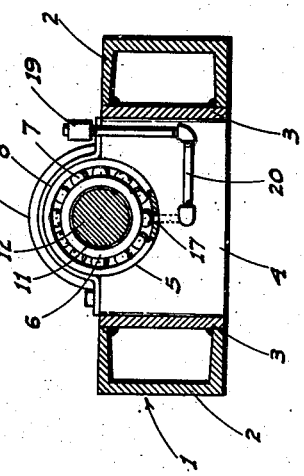
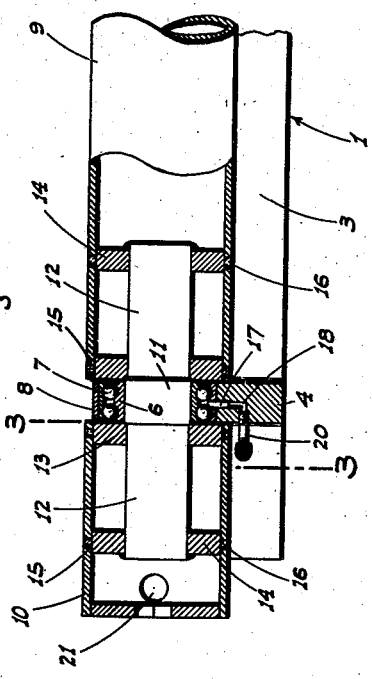
INVENTOR.
Hiram C. Holmes
BY
            ATTYS Patented Oct. 19, 1948

2,451,620

UNITED STATES PATENT OFFICE 2,451,620

LUMBER ROLL ASSEMBLY

Hiram C. Holmes, Stockton, Calif.

Application September 23, 1946, Serial No. 698,677

2 Claims. (Cl. 193—42)

This invention relates to lumber rolls such as are mounted on flat bed trucks for loading lumber thereon.

The principal object of the invention is to provide a roll assembly for the purpose which is so constructed that a free turning roll action is obtained even after long use, and also combining lightness with strength so that the assembly may withstand rough usage without damage. A very efficient roll assembly is thus provided.

The above and other objects are accomplished by means of such structure and relative arrangement of parts as will fully appear by a perusal of the following specification and claims.

In the drawings:

Figure 1 is a side elevation of the improved roll assembly.

Figure 2 is an enlarged fragmentary sectional elevation of the same.

Figure 3 is a cross section on line 3—3 of Fig. 2.

Referring now more particularly to the characters of reference on the drawings, the assembly comprises an elongated base indicated generally at 1 and which is preferably fabricated from a pair of channel irons 2 facing each other in spaced relation and across the open faces of which plates 3 are welded so as to form rigid hollow beams of rectangular cross section.

The base beams are connected centrally of their length, and adjacent but short of their ends by transverse cradle blocks 4 welded to the plates 3 and which are formed with substantially semicircular seats 5 in their upper faces; the center of the seats being in line with the top of the beams. These seats are arranged to support the outer races 6 of two-row ball bearings 7. The bearings 7 are held against vertical displacement by arcuate straps 8 over the same and bolted to the blocks.

The roll assembly comprises a pair of relatively long tubular members 9 extending between adjacent bearings and relatively short tubular members 10 extending outwardly from the endmost bearings at a distance beyond the ends of the beams 2, as shown in Fig. 1. The roll members are of greater diameter than the ball bearings and the embracing straps 8 but are of less diameter than the space between the beams 2.

The adjacent ends of any roll members are mounted in connection with the adjacent ball bearing therebetween in the following manner:

Pressed into the inner race of said ball bearing is the central enlarged portion 11 of a stub shaft 12 which extends equal distances on both sides of the bearing. The portion 11 is slightly wider than the bearing and projects clear of the same on both sides thereof as shown in Fig. 2. Pressed onto the shaft portion 12 into abutting relation with the portion 11 are heavy discs 13 of a size to fit snugly into the tubular roll members, all of which are of the same diameter both externally and internally. Welded onto the shaft portions 12 at their outer end are similar sized discs 14. The roll members are slid into place on the discs after the latter are thus mounted, so that their ends are flush with the discs 13. In order to rigidly secure the roll members to the discs, said members are formed with a number of radial holes 15 alined with the disc and through which a weld with the discs is made as indicated at 16.

In this manner a rigid roll assembly is formed, all sections or members of which turn as one, while the ball bearings, which give the desired freedom of rotation, are well protected against damage as will be evident.

Each ball bearing is held against axial shifting by means of a small radial tube 17 seated in the cradle block 4 and projecting into the outer race 6 of the bearing. In order to lubricate the bearing through said tube, a passage 18 is drilled in the block 4 to the adjacent end of said tube and to the outer end to which passage a readily accessible grease fitting 19 is connected by suitable piping 20 disposed to one side of the block in the space between the beams 2.

In order to rotate the roll assembly from either end by hand when desired, the endmost roll members 10, outwardly of the ends of the base beams 2, are provided with radial holes 21 to receive a pry bar.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A lumber roll assembly comprising a base which includes horizontally spaced beams, a roll unit between and projecting above the beams and comprising a plurality of alined spaced roll members, said members being tubular, bearings mounted on the base between the members, individual stub shafts engaging the bearings, said bearings being ball bearings and each shaft including an enlarged central portion secured in the inner race of its bearings and wider than the same and reduced end portions projecting from the central portion on both sides of the bearings, discs fixed on each end portion of the shaft with one such disc abutted against the adjacent end of the central portion and means securing the discs in the roll members; said one disc being flush with the end of the corresponding roll member.

2. A unitary roll assembly for lumber trucks comprising a pair of spaced apart beams, cradle blocks secured across between the beams and rigidly secured to the latter, each cradle block having formed in its upper face an upwardly opening semi-circular bearing seat, the open top of the seat being in substantial alinement with the top of the beams, a double race ball bearing disposed in each seat, an arcuate strap disposed over the bearing and secured to the cradle block to hold the bearing in the seat, a stub shaft for each bearing, such stub shaft having an enlarged central portion pressed into the central race of the bearing and such central portion being slightly longer than the width of the bearing and projecting clear of both sides thereof, a disc pressed onto each end of the stub shaft and against the adjacent face of the enlarged central portion thereof and covering the adjacent outer face of the bearing, and tubular members disposed over and secured to the discs on opposite sides of the cradles, the outer circumferences of the tubular members extending clear of the holding straps for the bearings.

HIRAM C. HOLMES.

REFERENCES CITED

The following references are of record in the file of this patent:

UNITED STATES PATENTS

| Number | Name | Date |
|---|---|---|
| 696,777 | Ward | Apr. 1, 1902 |
| 999,310 | Karches | Aug. 1, 1911 |
| 1,404,069 | Swinehart | Jan. 17, 1922 |
| 1,752,675 | Larson | Apr. 1, 1930 |